Jan. 1, 1935.  C. ROCKWELL  1,986,163
BEATER
Filed June 26, 1934
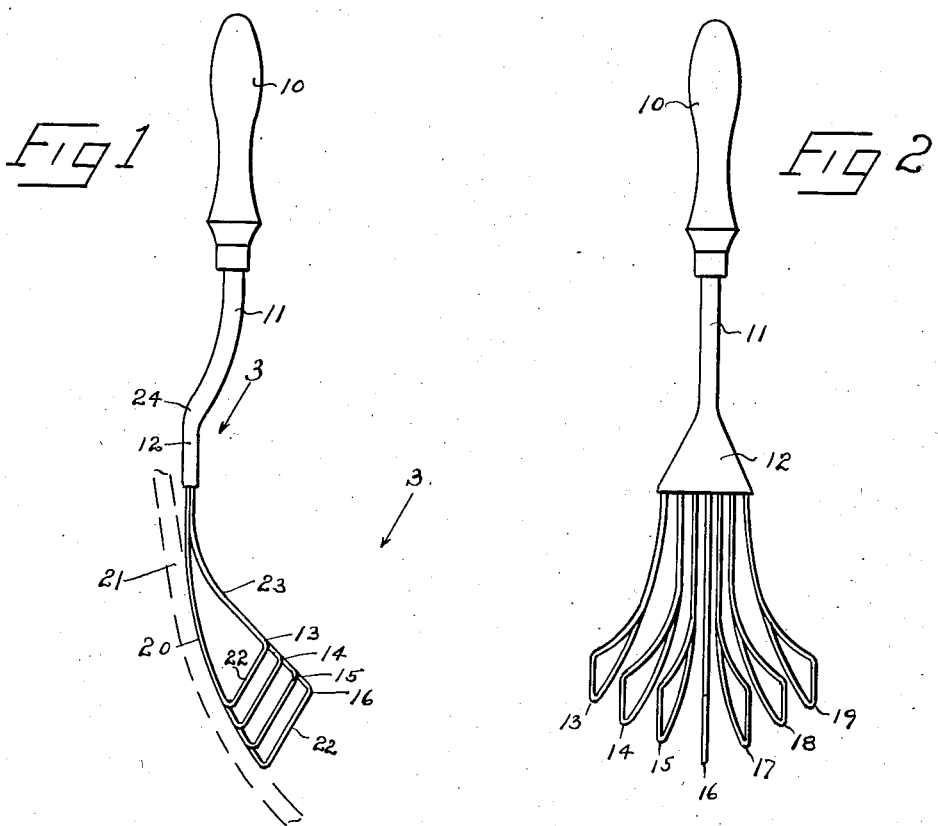
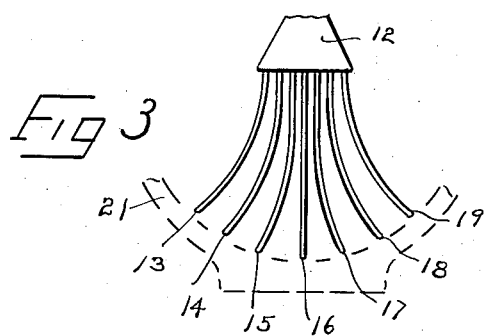
INVENTOR.
Christina Rockwell
BY
ATTORNEYS.

Patented Jan. 1, 1935

1,986,163

UNITED STATES PATENT OFFICE 1,986,163

BEATER

Christina Rockwell, Bellmore, N. Y.

Application June 26, 1934, Serial No. 732,397

4 Claims. (Cl. 259—144)

The invention relates to culinary implements of the kind used for beating, mixing or stirring various ingredients, such as, eggs, cream, batter and the likes. It has for its main purpose to provide an implement with which any of these operations may be performed with a minimum expenditure of time and labor.

Another object is to so construct the implement that it will effectively reach all parts of the vessel or bowl in which the mixing, stirring or beating is being performed, so as to thoroughly disintegrate and mix the materials therein, and particularly so as to prevent unmixed portions from adhering to the vessel or bowl. A further object is to provide an implement of strong and sanitary construction, which has no parts readily broken or bent, and which can be manufactured at a low cost.

These and various other objects and advantages will be readily understood from the following description and from the accompanying drawing in which, however, modifications may be made without departing from the scope of the appended claims. In the drawing:

Fig. 1 is a side view of a preferred embodiment of the beater,

Fig. 2 a front view of same, and

Fig. 3 a part of the beater viewed from the direction indicated by the arrows 3—3 in Fig. 1.

Referring now to all the views, simultaneously, the beater consists of a handle 10 in which a shank 11 is inserted. This shank is flared at its lower end 12 and this end supports a plurality of wire paddles 13, 14, 15, 16, 17, 18 and 19.

Each paddle is formed from a single piece of wire which is first curved, as at 20, to conform to the shape of the bowl 21 in which the mixing is taking place. It is then looped, as at 22, and finally curved back, as at 23, to over-lap the other end of the wire. Both ends of each wire loop is held securely in the shank. The paddles are made of very stiff wire, such as piano wire, for example.

The paddles are arranged in a fan shape and all the paddles on one side of the center paddle 16 are curved to the left, while all the paddles on the other side of the center paddle are curved to the right. This is plainly shown in Figs. 2 and 3.

The paddles are also of varying lengths; the center paddle being the longest. This causes the ends of the paddles when placed in the bottom of the bowl 21, as shown in Fig. 3, to substantially conform to the shape of the bowl. The shank is preferably offset, as shown at 24, to bring the handle member in towards the center of the bowl, when in use.

The plurality of paddles greatly facilitates the operation of the implement. The right and left curvature of the paddles further facilitate the operation, in that it causes added agitation at both the front and back strokes of the beater. The shape of the paddles, as at 20, makes it possible to remove all unmixed material from the sides of the bowl. When the ends of the paddle are used as in Fig. 3, every part of the inner bottom of the bowl will be reached by the paddles and thus, here again, accumulation of unmixed material will be prevented. In mixing small quantities of material, the beater works particularly effectively when used in the position shown in Fig. 3.

Having described my invention and its objects, what I claim is new and wish to protect by Letters Patent is:

1. In an implement of the class described, a plurality of paddles each formed of a single looped wire, the end of each loop being straight, one side of each loop curved outwardly, the second side of each loop curved in the same direction as the first side; the extreme ends of the wires of each loop in parallel contact with each other, a handle member to which said paddles are secured and from the end of which they project in spaced relation, all of the paddles on one side of the center axis of the implement curved sidewardly in one direction, and all the paddles on the other side of the axis curved sidewardly in the opposite direction.

2. In an implement of the class described, a plurality of paddles each formed of a single looped wire, the end of each loop being straight, one side of each loop curved outwardly and bent to form an acute angle with the straight end of the loop, the second side of each loop curved in the same direction as the first side; the extreme ends of the wires of each loop in parallel contact with each other, a handle member to which said paddles are secured and from the end of which they project in spaced relation, all of the paddles on one side of the center axis of the implement curved sidewardly in one direction, and all the paddles on the other side of the axis curved sidewardly in the opposite direction.

3. In an implement of the class described, a plurality of paddles each formed of a single looped wire, the end of each loop being straight, one side of each loop curved outwardly and bent to form an acute angle with the straight end of the loop, the second side of each loop curved in the same direction as the first side; the extreme ends of the wires of each loop in parallel contact with each other, a handle member to which said paddles are secured and from the end of which they project in spaced relation, all of the paddles on one side of the center axis of the implement curved sidewardly in one direction, all the paddles on the other side of the axis curved sidewardly in the opposite direction, and the paddles made of various lengths so that their outer straight ends will form a transverse curve.

4. In an implement of the class described, a plurality of paddles each formed of a single looped wire, the end of each loop being straight, one side of each loop curved outwardly and bent to form an acute angle with the straight end of the loop, the second side of each loop curved in the same direction as the first side; the extreme ends of the wires of each loop in parallel contact with each other, a handle member to which said paddles are secured and from the end of which they project in spaced relation, all of the paddles on one side of the center axis of the implement curved sidewardly in one direction, all the paddles on the other side of the axis curved sidewardly in the opposite direction, the paddles made of various lengths so that their outer straight ends will form a transverse curve, and the handle member offset in the opposite direction to the outwardly-curved sides of the paddles.

CHRISTINA ROCKWELL.